F. W. HEYWOOD.
METAL CUTTING TOOL.
APPLICATION FILED JAN. 29, 1920.

1,348,279.

Patented Aug. 3, 1920.

Inventor:
Frederick W. Heywood,
by Spear Middleton Donaldson & Ball
Attys.

F. W. HEYWOOD.
METAL CUTTING TOOL.
APPLICATION FILED JAN. 29, 1920.
1,348,279.
Patented Aug. 3, 1920.
2 SHEETS—SHEET 2.
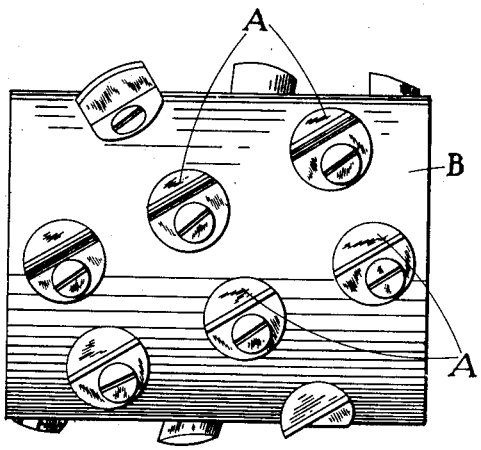
FIG.11.
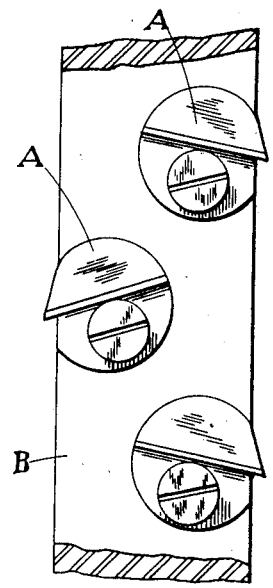
FIG 13.
FIG.12.
FIG.14.
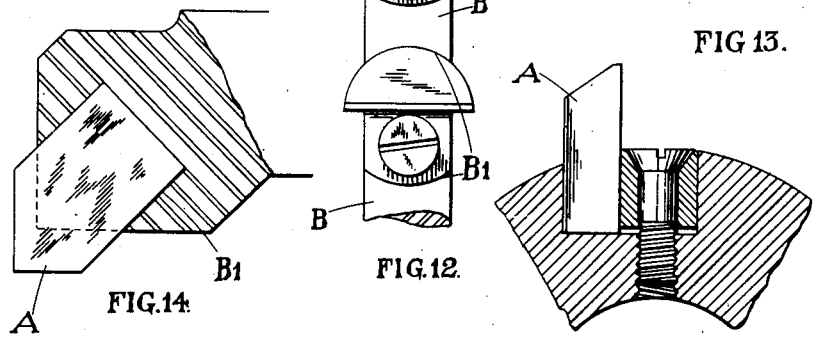
FIG.17.
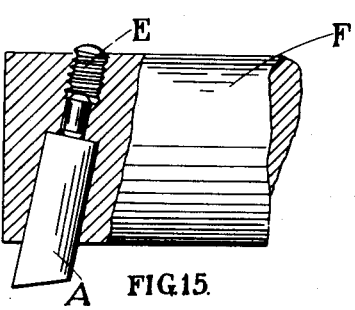
FIG.15.
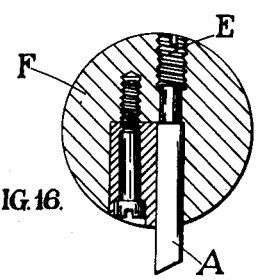
FIG.16.
Inventor;
Frederick W. Heywood,
by
Attys.

UNITED STATES PATENT OFFICE.

FREDERICK WILLIAM HEYWOOD, OF PRAHRAN, MELBOURNE, AUSTRALIA.

METAL-CUTTING TOOL.

1,348,279.   Specification of Letters Patent.   Patented Aug. 3, 1920.

Application filed January 29, 1920. Serial No. 354,826.

*To all whom it may concern:*

Be it known that I, FREDERICK WILLIAM HEYWOOD, a subject of the King of England, residing at Prahran, Melbourne, Australia, have invented certain new and useful Improvements in Metal-Cutting Tools, of which the following is a specification.

This invention relates to cutting tools such as milling or other cutters in which the teeth are inserted and secured in the body of the tool, and has for its object to provide simple means for rigidly securing such cutting teeth, and also for releasing them when desired.

In the accompanying drawings, which illustrate the manner of carrying out this invention, Figures 1 and 2 are respectively, an elevation partly in section, and a plan, showing the manner of securing the cutting tooth.

Figs. 11, 12 and 13 illustrate various types of tools fitted with cutting teeth according to this invention.

Fig. 14 shows a cutter for end and side milling.

Figs. 15 and 16 show an application of the cutting-tooth to a boring-bar, and

Fig. 17 shows a construction in which the cutting-tooth is given a certain amount of rake.

Like letters indicate like parts throughout the drawings.

Figure 1:
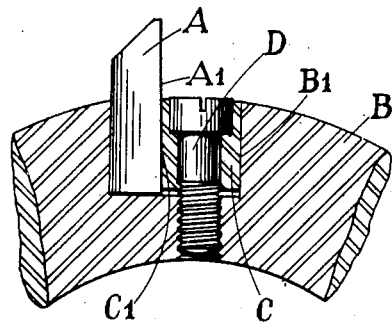
Figure 2:
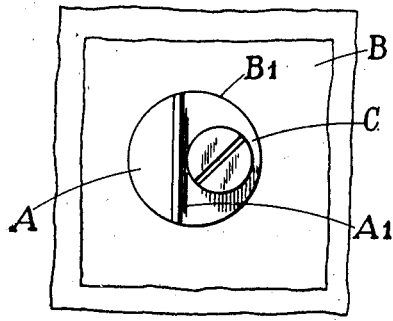

In the construction shown in Figs. 1 and 2, the cutting-tooth A is of parti-circular cross-section, preferably semi-circular, and is inserted in a parallel-sided cylindrical recess $B^1$ in the body B of the tool which carries it. The flat-face $A^1$ of the cutting tooth A is somewhat inclined to the axis of the recess $B^1$ so that the widest part of the tooth A is at the bottom of the recess. A locking-piece C formed with a wedge face $C^1$ to bear against the cutting tooth A is inserted in the recess $B^1$ and when forced home therein causes the cutting tooth A to be securely thrust against both the side and bottom walls of the recess. A setscrew D extends axially through the locking piece C and is threaded into the body B of the tool. The position of this screw D is eccentric to the recess $B^1$ and therefore it prevents rotation of the cutter A in the recess. By making the combined cutting tooth and locking piece a close fit in the recess and having a comparatively fine taper to their wedge faces the tooth is held rigidly in the recess B and its frictional grip on the sides thereof coöperates with the screw D to prevent possibility of its rotation therein.

Figure 5:
Figs. 5 and 6 are side and end views of a cutting tooth as shown in Figs. 1 and 2.
Figure 7:
Figs. 7 and 8 are respectively a sectional elevation and an end view of the locking-piece shown in Figs. 1 and 2.
Figure 6:
Figure 8:
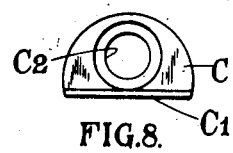

The cutting tooth A is shown removed from the recess in Figs. 5 and 6 and the locking piece C employed with it is shown separately in Figs. 7 and 8. To provide a simple means for withdrawing the locking piece from the recess to thereby remove the cutting tooth the sides of the hole $C^2$ which receives the setscrew are screw threaded so that they can be readily engaged by an extractor device of known form.

Figure 3:
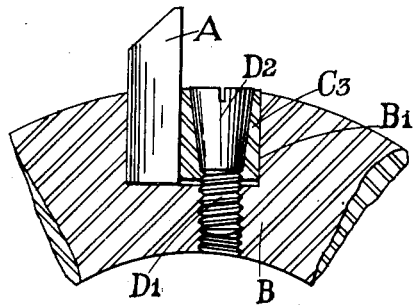
Figs. 3 and 4 are views similar to the foregoing but of a modified construction.
Figure 4:
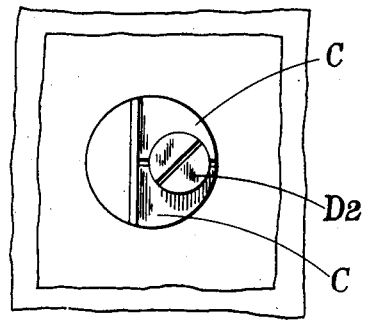
Figure 9:
Figs. 9 and 10 are side and end views of locking-pieces as employed in Figs. 3 and 4.
Figure 10:

In the modified construction shown in Figs. 3 and 4 the locking piece C is split lengthwise of the setscrew hole $C^2$ either on one side, or as shown, on both, to separate it in two parts. The setscrew D is provided with a countersunk head $D^2$ having a relatively sharp taper as shown in Fig. 3, and the hole $C^3$ which receives it is correspondingly coned. With this arrangement the abutting faces of the cutting tooth and locking-piece need not be inclined to give a wedge-action as in the previous construction, as this effect is obtained by the lateral thrust on the two parts of the locking-piece C when the setscrew D is screwed home. In this arrangement it will be evident that when the setscrew $D^1$ is removed, the locking piece C and cutting tooth A can be readily withdrawn from the recess $C^1$ whether their abutting faces are of wedge form or not. The split-locking piece C is shown in Figs. 9 and 10.

In Figs. 11, 12 and 13 are shown respectively a spiral milling cutter and slotting cutters each built up with teeth A inserted in its body in the manner above described. It will be seen that the slotting cutter, Fig. 12, has the walls of the recess $B^1$ partly removed on both sides to allow the sides of the cutting tooth A to protrude, but sufficient of the walls of the recess $B^1$ is left to provide for securely holding the cutting tooth.

In Fig. 14 the recess $B^1$ is formed at the edge of the body B and its axis is inclined diagonally to the side and end of the latter, the cutting-tooth A being shaped to cut at the side and end of the body B. This construction is specially suitable for end mills or fly-cutters.

In Figs. 15 and 16 the invention is applied to the fixing of a cutter in a boring-bar F, the axis of the recess being inclined to the bar axis at an appropriate angle. A feature of this arrangement is the employment of an adjusting screw E in the body of the bar F arranged to bear on the end of the cutter A to permit of close adjustment of the amount by which its cutting point projects from the bar.

In Fig. 17 the recess which receives the cutting tooth A is inclined to a radial line through the axis of rotation of the cutter body to give to the cutting tooth such rake as may be desirable according to the nature of the material cut.

It will be seen that cutting-teeth and locking-pieces for the purpose of this invention can be readily formed from half-round bars or by slitting round bars lengthwise. The locking-pieces may be made from mild-steel and if desired may be case hardened. Where round bars are slit for either purpose it may be necessary to employ packing pieces to compensate for the metal removed in the slitting process.

What I claim as my invention and desire to secure by Letters Patent is:—

In a cutting tool, the combination of a body part, a parallel-sided cylindrical recess therein, a cutting tooth of parti-circular cross section located in said recess, a locking piece also of parti-circular cross-section, constituting a wedge and filling said recess, and a set screw extending through said locking piece and screwed into the bottom of the recess eccentrical to said recess substantially as set forth.

In testimony whereof I have signed my name to this specification in the presence of two subscribing witnesses.

FREDERICK WILLIAM HEYWOOD.

Witnesses:
C. R. HODGSON,
T. S. TANNER.